(12) United States Patent
Koslar et al.

(10) Patent No.: US 7,333,552 B2
(45) Date of Patent: Feb. 19, 2008

(54) METHOD FOR CODING AND DECODING AN INFORMATION SYMBOL

(75) Inventors: Manfred Koslar, Berlin (DE); Rainer Hach, Berlin (DE)

(73) Assignee: Nanotron Technologies GmbH, Berlin (DE)

( * ) Notice: Subject to any disclaimer, the term of this patent is extended or adjusted under 35 U.S.C. 154(b) by 691 days.

(21) Appl. No.: 10/363,968

(22) PCT Filed: Sep. 4, 2001

(86) PCT No.: PCT/EP01/10140

§ 371 (c)(1),
(2), (4) Date: Jul. 3, 2003

(87) PCT Pub. No.: WO02/21783

PCT Pub. Date: Mar. 14, 2002

(65) Prior Publication Data

US 2004/0008797 A1    Jan. 15, 2004

(30) Foreign Application Priority Data

Sep. 7, 2000 (DE) .............................. 100 44 227.7

(51) Int. Cl.
*H04B 15/00* (2006.01)
(52) U.S. Cl. .................................. 375/285
(58) Field of Classification Search ............... 375/224,
375/226, 227, 228, 316, 322, 324, 329, 331,
375/332, 340, 341, 346, 377, 285, 259, 271,
375/279, 280, 281, 284; 714/709, 699, 780,
714/752, 746
See application file for complete search history.

(56) References Cited

U.S. PATENT DOCUMENTS

| | | | |
|---|---|---|---|
| 5,159,610 A | 10/1992 | Eyuboglu et al. | |
| 5,455,839 A | 10/1995 | Eyuboglu | |
| 5,570,388 A | 10/1996 | Halpern | |
| 5,696,769 A * | 12/1997 | Choi et al. | ............ 714/746 |

FOREIGN PATENT DOCUMENTS

| | | |
|---|---|---|
| DE | 44 40 947 | 4/1996 |
| DE | 199 12 825 | 8/2000 |
| EP | 0 555 013 | 8/1993 |

* cited by examiner

*Primary Examiner*—Pankaj Kumar
(74) *Attorney, Agent, or Firm*—Neil A. Steinberg

(57) ABSTRACT

A method and a device for the coding and/or decoding of an information symbol for transmission over a transmission channel or a received signal value is described and illustrated, whereby a channel symbol used for coding is selected from at least two available channel symbols by means of a pre-calculated expected received signal value. The pre-calculation is achieved, based on the echo properties of the transmission channel and transmission values already sent. A pre-coding method with low receiver-side calculation requirement is thus prepared, whereby the information symbol can be transmitted by means of various channel symbols and thus various transmission values can also be transmitted. The possible selections may be used for minimization of the transmission energy and/or to achieve a minimal disturbance or even a constructive effect through the inter-symbol interference occurring on transmission.

28 Claims, 10 Drawing Sheets

METHOD FOR CODING AND DECODING AN INFORMATION SYMBOL

BACKGROUND OF THE INVENTION

The present invention pertains to a method for coding and decoding an information symbol or stream of information symbols to be transmitted across a transmission channel. Furthermore, the invention pertains to devices for encoding a signal to be transmitted and decoding a signal value received.

Transmission channels must generally deal with echoes, multipath propagation, preoscillation and postoscillation. These effects result in inter-symbol interference (ISI) between symbols occurring consecutively in time. In the general case, it is not possible to invert the transfer function of the transmission channel and thereby eliminate the perturbing influence of the transmission channel.

It is known that the perturbing influence of the transmission channel can be reduced by devices at the receiver side, such as equalizers or maximum likelihood sequence estimation.

At the sending side of a transmission system, precoding represents a way of reducing the perturbing influence of ISI caused by the transmission channel. Based on the Tomlinson Method as described by M. Tomlinson in "New Automatic Equalizer Employing Modulo Arithmetic," Electronics Letters, 25 Mar. 1971, Vol. 7, pp. 138-139, numerous investigations have been conducted on the topic of precoding and various precoding variants have been developed.

BRIEF SUMMARY OF THE INVENTION

Both the Tomlinson Method and all other known preceding variants nevertheless require a certain computation expenditure at the receiver side in the form of operations which are adapted to the precoding at the sending side.

In view of this problem, the invention provides a method and a device for the encoding and decoding of information signals by which the required computational expense can be diminished, especially at the receiving side.

According to the invention, a stable transmission of predistorted symbol streams across transmission channels with strong reflection can be achieved with little computational expense at the receiving side. For this, a channel symbol alphabet is defined, which is more powerful, i.e., it contains more elements, than the alphabet of the information symbols being transferred (information symbol alphabet). Due to the fact that the channel symbol alphabet is more powerful than the information symbol alphabet, the result is possibilities for choosing the form in which an information symbol can be transmitted by means of different channel symbols. Therefore, the encoding or precoding method proposed herein is designated hereafter as multiple-choice preceding (MCP). Said possibility of choice is utilized so that a transmission value is sent with the lowest possible energy at the sending side, while the ISI produced by it has minimal perturbation or is even constructive in effect.

Compared to known precoating methods, the advantage of MCP consists in the fact that no additional computational operations are required at the receiving side. This not only reduces the costs, but also any time delay or sources of error such as quantization errors or parameter inaccuracies. As a kind of side effect, in the case of constant symbol sequences MCP can take on the function of a scrambler (cf. Lochmann, Digitale Nachrichtentechnik, Verlag Technik GmbH, Berlin 1997, $2^{nd}$ edition, ISBN 3-241-01184-6) and thereby facilitates the bit sequence-independent symbol synchronization at the receiving side with high data rates.

From U.S. Pat. No. 5,570,388 a method of a device is known wherein simple codes are used for wireless transmission of nondata symbols. This publication defines a "spare symbol," yet unlike the present invention this carries no information, but instead fulfills a delimiter function.

From DE 199 12 825 there is known a method of a receiving arrangement for a radio station to detect a data symbol. A certain agreement with the present invention consists in that distances from constellation points (or constellation regions in the present invention) are determined and taken into account. In contrast to the present invention, however, all calculations take place at the receiving side and not, as in the present invention, at the sending side. The teaching of DE 199 12 825 in no way achieves the goal of having the receiving side be organized as simple as possible.

From DE 198 24 408 there is known a receiver for a digital transmission system, yet as in the case of DE 199 12 825 it specifies a special equalizer at the receiving side, by which the necessary computations are carried out.

From DE 44 40 947 a method is known for digital transmission of messages. This publication makes close reference to the Tomlinson-Harashima Method and describes a further development of same. The publication quite generally goes into the lessening of signal dynamics at the receiving side. An important difference between what is disclosed in DE 44 40 947 and the present invention is that, with the Tomlinson-Harashima Method as well as DE 44 40 947, a modulo-N operation with respect to the signal amplitude is required at the receiver side. As is further pointed out in DE 44 40 947, due to the periodic continuation of the amplitude constellation on a real-valued axis in the Tomlinson-Harashima Method there are not many signal values to represent a signal symbol or many signal values to represent a transmitter symbol according to DE 44 40 947.

In the present invention, on the other hand, one essentially uses a complex plane. In the sample embodiment provided in the present application, the channel symbol alphabet differs from the information symbol alphabet also in the number of possible phase values of its elements. Because of the direct use of the complex plane, the problem of intensified signal dynamics at the receiving side does not occur in the present invention and an infinite predictable set of "sending values" is not required as in the Tomlinson-Harashima Method.

Preferably, the position of an uncertainty region in the complex plane is defined by the channel properties and by the sending values which were sent in the past, and the size and shape of this uncertainty region are defined by the sending values to be sent in future. The position of the uncertainty region is determined by an ISI component $E^{ISIpost}$, which can be exactly calculated in advance by means of the channel properties and the sending values sent in the past. An additional ISI component $E^{ISIpre}$, which is created by future sending values interacting with the channel properties, cannot be exactly computed in advance because of causality reasons. The shape and size of the uncertainty region, however, allow for the possible influence which $E^{ISIpre}$ might have in the detection of the signal currently being transmitted. The choice at the sending side of the desired channel symbol which can be chosen at the receiving side is based on its position in relation to the presently calculated uncertainty region.

The channel properties, especially the preoscillation and postoscillation behavior of the transmission channel, can be determined preferably by means of the channel pulse response. The channel pulse response can be found by measurement techniques, for example, and be updated in predetermined intervals of time.

According to a preferred embodiment, one can select the channel symbol which has the smallest distance in the complex plane from all selectable channel symbols and thus has the smallest correction value with regard to the point of the uncertainty region which is most distant from it. This "minimal maximum value" is hereafter termed the "smallest correction value". This selection criterion ensures a high probability of the correct decision at the receiving side with regard to the channel symbol contained in the reception value, while at the same time minimizing the energy of the sending value.

According to another advantageous embodiment, the sending value "0" (physically nothing is sent) can occur if the presently calculated uncertainty region is situated in an area which leads with high probability to a decision at the receiving side for a channel symbol that can be selected for the transmission of the present information symbol. This means that the ISI produced by past sending values has constructive effect and is sufficient for transmitting the channel symbol selected for the present information symbol.

Preferably, one can delimit the region of the sending value by limiting the complex components of a sent sending value to a maximum value each time. This results in a limiting of the transmission energy.

As the distance used during the decoding, one can preferably calculate a Euclidean distance or a Hamming distance. These quantities furnish a measure for the decision-making distance between different possible channel symbols.

According to another advantageous embodiment, the calculating arrangement provided in the encoding device can comprise a first memory arrangement for storing the sending values already sent, a second memory arrangement for storing of channel coefficients which describe the postoscillation of the transmission channel, a multiplication arrangement for multiplying the sending values already sent with the corresponding channel coefficients, and an addition arrangement for adding up the results of the multiplication. By progressively storing the sending values already sent in the first memory arrangement and updating in time the channel coefficients in the second memory arrangement, a simple adaptation of the encoder to the given transmission situation is possible with low computational expense. The expected reception signal values can then be computed in advance in the calculating arrangement, preferably by means of the addition result, the selected channel symbol, and an expectation value taking into account the preoscillation behavior of the transmission channel. This makes it possible to factor in the preoscillation behavior of the transmission channel. In order to reduce the ISI caused by the preoscillation behavior, a prefilter adapted to the transmission channel can also be provided.

BRIEF DESCRIPTION OF THE DRAWINGS

The invention shall now be explained more closely by means of a preferred sample embodiment making reference to the enclosed figures. These show.

DETAILED DESCRIPTION OF THE INVENTION

The preferred sample embodiment shall be explained hereafter, at first in general form and then on the special example of a BPSK modulation.

Figure 1:
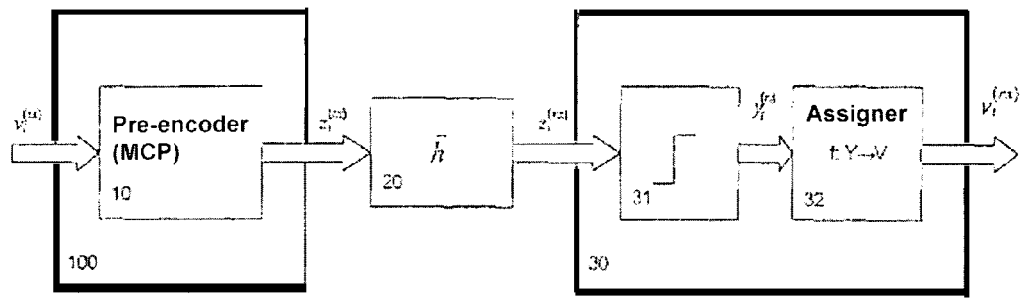
FIG. 1 a block diagram of a transmission system according to the preferred sample embodiment, FIG. 2 a block diagram of an encoder according to the preferred sample embodiment, FIG. 3 a flow chart of an encoding method according to the preferred sample embodiment, FIGS. 4A-4C sample representations of the smallest correction value and the computed sending value for a case decision as explained in the preferred sample embodiment, FIG. 5 a flow chart of a decoding method according to the preferred sample embodiment, FIG. 6 a representation to explain a decision distance used during the decoding, FIG. 7 a diagram to represent decision regions used in a BPSK encoding, FIG. 8 an example of a complex pulse response of a transmission channel, FIG. 9 a complex diagram to represent the constellation of a BPSK symbol stream present at the receiver input without using the encoding according to the invention, FIG. 10 a complex diagram to represent the constellation of a BPSK symbol stream present at the receiver input when using the encoding according to the invention, FIG. 11 a complex diagram to represent the constellation at the receiver input in the case of a constant sequence of identical information symbols making use of the encoding according to the invention, and FIG. 12 a flow chart to show the calculation of a sending value in forward-looking MCP.

FIG. 1 shows a block diagram of the symbol flow in a baseband model during a transmission of information symbols making use of several selectable channel symbols (MCP method). According to K. D. Kammayer, "Nachrichtenübertragung," B. G. Teubner-Verlag Stuttgart, $2^{nd}$ edition, ISBN 3-519-16142-7, complex-valued signals are designated here by block arrows. Signals, symbols and values at the transmitter side are designated with $^{(tx)}$, signals, symbols and values at the receiver side are designated with $^{(rx)}$. The index i is used as the discrete time index. For an information symbol $v_i^{(tx)} \in V$ present at the transmitter input at time i, the pre-encoder ($f^{MCP}(\cdot)$) 10 selects a channel symbol which is desirable at the receiver input and from this calculates a sending value $z_i^{(tx)} \in Z^{(tx)}$ to be sent out. This calculation makes use of both the channel properties and the sending values sent in the past. We have:

$$z_i^{(tx)} = f^{MCP}(v_i^{(tx)}, \overline{h}, z_{i-1}^{(tx)}, z_{i-2}^{(tx)}, \ldots, z_{i-n}^{(tx)}), \quad (1)$$

where n corresponds to the memory depth of a channel 20 used for the transmission with the characteristic $$\overline{h}' = [h_0, h_1, \ldots h_n], mit\ h_0, h_n \neq 0,$$

with $h_0, h_n \neq 0$, and thus the channel order.

The sending value $z_i^{(tx)}$ generated in a pre-encoder 10 of a transmitter 100 by the MCP method is sent via the channel 20. From the reception value $z_i^{(rx)}$ arriving at the input of a receiver 30 after a time delay, the fundamental channel symbol $y_i^{(rx)}$ is determined by means of a decider 31. From this channel symbol $y_i^{(rx)}$, a received information symbol $v^{i(rx)}$ is detected or determined by means of an assigner 32, making use of a mapping function $f(\cdot)$, which is a simple single-valued but not reversible mapping. For this detection process, a detection error $D^{err}(z^{(rx)}, y^{(rx)}, v^{(tx)})$ is defined according to the following equation (2), which can be computed in advance at the transmitter side. $D^{err}(\cdot)$ is dependent on the reception value $z^{(rx)}$ calculated in advance at the decider input, the channel symbol $y^{(rx)}$ detected from this, and the desired information symbol $v^{(tx)}$ which should appear at the receiver output:

$$D^{err}(z^{(rx)}, y^{(rx)}, v^{(tx)}) = \begin{cases} -1 \cdot BordDist\{z^{(rx)}, y^{(rx)}\} & \text{if } f(y^{(rx)}) = v^{(tx)} \\ BordDist(z^{(rx)}, y^{(rx)}) & \text{if } f(y^{(rx)}) \neq v^{(tx)} \end{cases} \quad (2)$$

Figure 6:
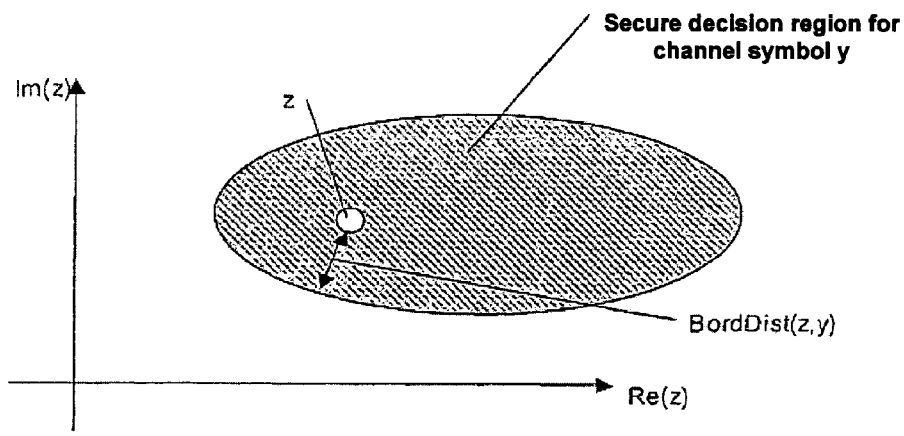

The function BordDist (z, y) provides the decision-making distance (see FIG. 6). By this is meant the Euclidean distance between the value z and the limits of the certain decision-making region of the channel symbol y detected by the decider 31. The Hamming distance or another suitable quantity can also be used as the decision-making distance.

Thus, the detection error $D^{err}$ ($z^{(rx)}$, $y^{(rx)}$, $v^{(tx)}$) is a measure of the uncertainty with which an information symbol $v^{(tx)}$ is correctly detected for a given reception symbol $z^{(rx)}$. The smaller the detection error, the more certain the detection. A negative detection error indicates that the reception symbol $z^{(rx)}$ lies within the certain decision-making region of a channel symbol $y^{(rx)}$ and that this channel symbol is mapped on the correct information symbol.

According to the preferred sample embodiment, at the transmitter side one calculates in advance the region in which the reception value will lie that the receiver will afterwards detect on the basis of the sending value now being determined. This requires at the transmitting side both knowledge of the channel $\bar{h}$, as well as knowledge of all synchronization, filtering and detection operations that will be carried out at the receiver side. It can be assumed to advantage that the receiver performs a detection in terms of symbols, that a reception value is sampled with a time delay of m symbol time steps relative to its sending time point, after which it is located at the amplitude maximum of the channel pulse response, and that the receiver 30 performs a phase synchronization so that the reception value sampled at the time point m is in correct phase. In a distortion-free system, in which the channel 20 has the time delay m and no preoscillation or postoscillation, the following equation (3) would hold for the detected reception values:

$$z_i^{(rx)} = \sum_{k=0}^{n} h_k \cdot z_{i-k}^{(tx)} = \sum_{k=0}^{n} \delta_{k,m} \cdot z_{i-k}^{(tx)} = z_{i-m}^{(tx)}, \quad (3)$$

where $\delta_{i,j}$ is the Kronecker symbol. Thus, the reception value received after m symbol time steps would correspond to the sent sending value as expected. On the other hand, in a real-world system, the reception value $z_i^{(rx)}$ will contain interference components from symbols situated near in time, as well as additive noise, due to the channel properties.

In order to allow for the preoscillation and postoscillation of the channel pulse response, it is assumed that the effective channel pulse response of the channel 20 located between the transmitter 100 and the receiver 30 has the following characteristic:

$$|h_0|, |h_1|, \ldots |h_{m-1}| < 1, h_m = 1, |h_{m+1}|, |h_{m+2}|, \ldots |h_n| \leq 1 \quad (4)$$

where the coefficients $h_0, h_1, \ldots h_{m-1}$ describe the preoscillation and the coefficients $h_{m+1}, h_{m+2}, \ldots h_n$ describe the postoscillation of the channel pulse response. Because of the delay m, the reception value $z_0^{(rx)}$ detected at the receiver input at time i=0 is:

$$(h_n \ldots h_{m+2}\ h_{m+1}) \cdot \begin{pmatrix} z_{-n}^{(tx)} \\ \vdots \\ z_{-m-1}^{(tx)} \end{pmatrix} + z_{-m}^{(tx)} + (h_{m-1} \ldots h_1\ h_0) \cdot \begin{pmatrix} z_{-m+1}^{(tx)} \\ \vdots \\ z_0^{(tx)} \end{pmatrix} = z_0^{(rx)} \quad (5)$$

The first summand on the left side of equation (5) describes ISI components $E^{ISIpost}$ that can be described by sending values which were sent prior to the sending value $z_{-m}^{(tx)}$ in time and are attributable to the postoscillation (post-cursor) of the channel, while the last summand describes the ISI components $E^{ISIpre}$ that are caused by preoscillation (pre-cursor) and are dependent on sending values that were sent after the sending value $z_{-m}^{(tx)}$ in time and consequently were not yet known when the sending value $z_{-m}^{(tx)}$ was sent. This can be represented by the following equation (6):

$$E_0^{ISIpost} + z_{-m}^{(tx)} + E_0^{ISIpre} = z_0^{(rx)} = y_0^{(rx)} + Error \quad (6)$$

The right side of the equation (6) shows that the reception value can be interpreted as the sum of a transmitted channel symbol and an error value caused by interferences.

In order to allow for the preoscillation of the channel 20, one establishes an upper limit value K for the expectation value $E\{\cdot\}$ of the sending symbols, so that: $E\{|z^{(tx)}|\} \leq K$. Thus, $E_0^{ISIpre}$ can be estimated from above. With the equation:

$$d = K \cdot \sum_{i=0}^{m-1} |h_i| \quad (7)$$

with the definition (A $\Rightarrow$ B: A implies B) one gets:

$$|E_0^{ISIpre}| \leq d \Rightarrow |real(E_0^{ISIpre})| \leq d, |imag(E_0^{ISIpre})| \leq d, \quad (8)$$

and in the following remarks we shall assume K=1. While the left side of equation (8) represents a circular disk in the complex plane, the right side of equation (8) describes a square which contains this circular disk and which shall be used for the further calculations for reasons of simplicity.

Thus, the reception value $z_0^{(rx)}$ detected at time i=0 was not exactly localizable in advance as a point in the complex plane at time i=−m. Therefore, a square region $S^{(rx)}(z)$ is defined by the following equation (9), within which the reception value is expected:

$$S^{(rx)}(E_0^{ISIpost} + z_{-m}^{(tx)}) = E_0^{ISIpost} + z_{-m}^{(tx)} \pm d \pm j \cdot d \quad (9)$$

The region:

$$S^{(rx)}(E_0^{ISIpost}) \quad (9a)$$

is defined hereafter as the uncertainty region at time i=0. It designates the region in which the ISI occurring at the receiver input at time i=0 must lie with high probability. Consequently, the region $S^{(rx)}(E_0^{ISIpost}+z_{-m}^{(tx)})$ describes the region in which the reception value $z_0^{(rx)}$ must lie with high probability. The size of the uncertainty region $S^{(rx)}$ ($E_0^{ISIpost}$) depends on the preoscillation behavior (oscillation build-up behavior) of the channel 20. If one further allows for the general requirement of sending out the lowest possible symbol energy in order to keep low any overmodulation distortions, the calculation of $z_{-m}^{(tx)}$ leads to the following optimization problem:

Find the $z_{-m}^{(tx)} = z_{opt}$ that requires the lowest possible transmission energy, i.e.

$$z_{opt} = \min(|z|^2), \quad (10a)$$

under the accessory conditions that z is contained in the set of possible sending symbols, i.e.

$$z \in Z^{(tx)} \quad (10b)$$

and that, for all $z_0^{(rx)} \in S_0^{(rx)}$, ($E_0^{ISIpost} + z$) leads to a correct detection of the information symbol at the receiver 30, i.e.

$$D^{err}(S_0^{(rx)}(E_0^{ISIpost} + z), y_0^{(rx)}, v_{-m}^{(tx)}) < 0 \quad (10c)$$

Thus, we have a nonlinear restrictive optimization problem. Without having accomplished an analytical proof of the solvability of this optimization problem, an easily implemented sample embodiment is given below, which solves at least approximately the above-defined optimization problem.

The pre-encoder function provided in the pre-encoder 10 can be realized in the form of a table of values after the channel property is discovered. The table of values can be realized, for example, as a table of values for probable types of channel pulse responses, and a selection can then be made using the measured channel property.

Figure 2:
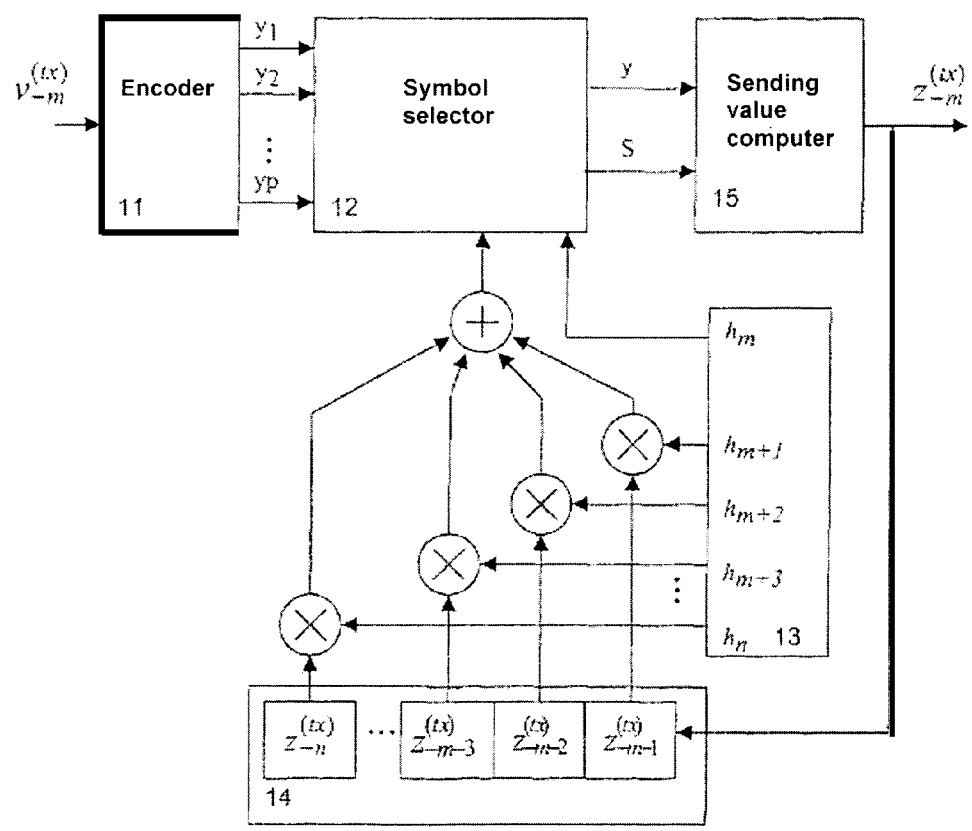

FIG. 2 shows a block diagram of the pre-encoder 10 according to the preferred sample embodiment, in which the indices indicated in equation (5) are used to identify the time sequence. The information symbol $v_{-m}^{(tx)}$ being transmitted is taken to an encoder 11, which generates p channel symbols y1 to yp selectable for $v_{-m}^{(tx)}$ and supplies them to a symbol selector 12. The encoder 11 can be realized by a memory table or the like. Furthermore, a symbol storage 14 is provided in the form of a parallel-readable shift register, in which the sending values $z_{-m-1}^{(tx)}$ to $z_{-n}^{(tx)}$ already sent are written in consecutively during each sending. The number n-m of stored sending values thus corresponds to the postoscillation time of the channel 20. Another parallel-readable coefficient storage 13 serves to store the coefficients $h_m$ to $h_n$ of the channel 20, and the coefficient $h_m$ is supplied to the symbol selector 12 in order to factor in the direct action of the channel 20 on the information symbol $v_{-m}^{(tx)}$ being transmitted.

Using a discrete convolution, the channel coefficients $h_j$ are multiplied with the corresponding stored sending values $z_j$ in corresponding multiplication arrangements and added together in an addition arrangement, in order to obtain in this way a characteristic value for the particular postoscillation of the channel 20, which is supplied to the symbol selector 12 and used to calculate the expected reception values or range of values (i.e., the uncertainty region S) used for the selection of the suitable channel symbol.

The channel symbol y selected by the symbol selector 12 and the uncertainty region $S^{(rx)}$ ($E^{ISIpost}$) calculated in the symbol selector are used by a sending value calculator 15 to calculate the present sending value $z_{-m}^{(tx)}$ as described hereafter.

The blocks shown in FIG. 2 can also be realized, of course, as program routines for a signal processor or the like provided in the transmitter 100.

Figure 3:
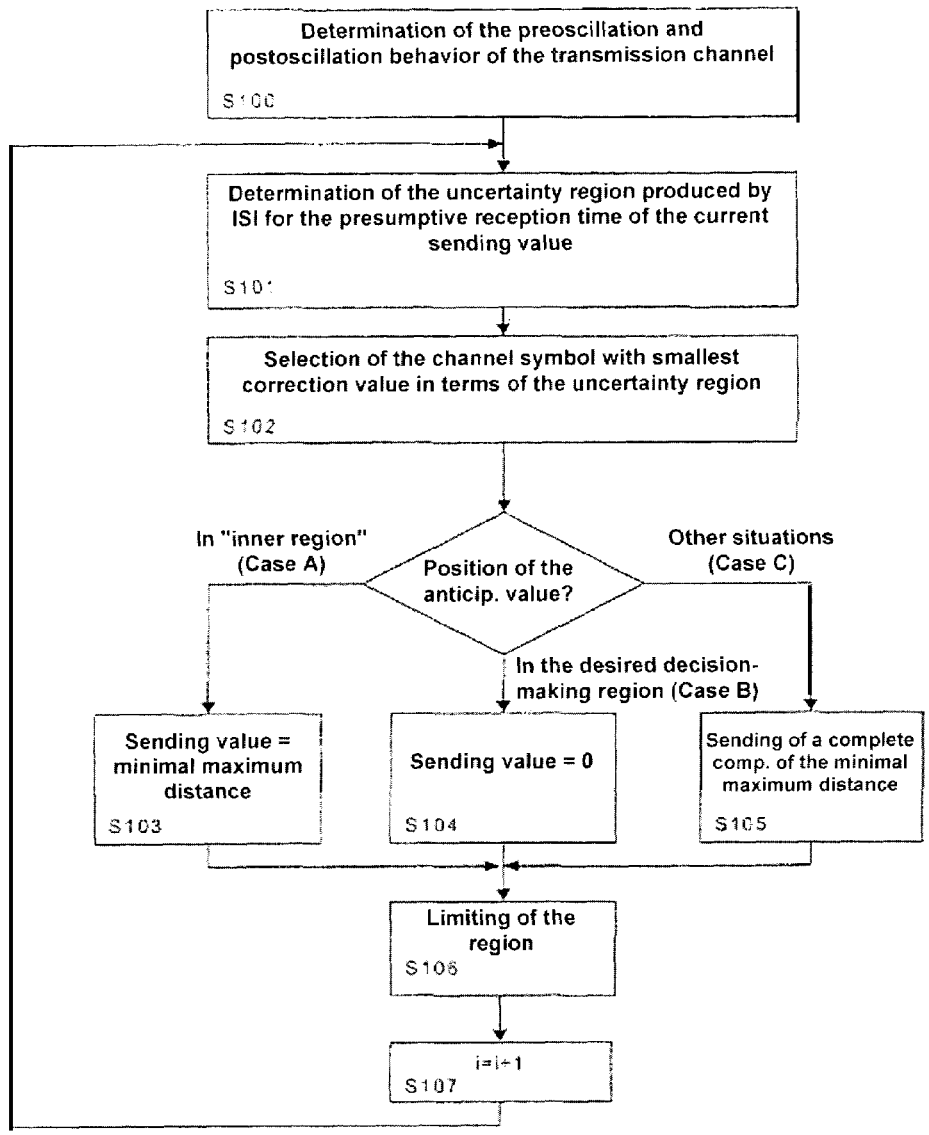

FIG. 3 shows a flow chart of the encoding process according to the preferred sample embodiment.

In step S100, the pre- and postoscillation behavior of the channel 20 is first determined, for example, by means of a measured channel pulse response $\bar{h}$ of the channel 20, and the corresponding coefficients are stored in memory. At time i, the information symbol $v_i^{(tx)}$ being transmitted and the past sending symbols $z_{i-1}^{(tx)}, z_{i-2}^{(tx)}, \ldots, z_{i-n+m}^{(tx)}$ stored in the symbol storage 14 are known, where n indicates the channel order and m the channel delay.

The sending value $z_i^{(tx)}$ to be emitted at time i is determined as follows. In step S101, the uncertainty region produced by the ISI for the reception at the receiver 30 at time i+m is calculated per equation (9a). This can be done, for example, by calculating the corner points of the uncertainty region $S^{(rx)}(E_{i+m}^{ISIpost})$. After this, in step S1102, the channel symbol which lies closest to the uncertainty region is determined. This can be done, for example, by determining, for each channel symbol $y_{j\ k,\ j} = 1, \ldots p$, that is possible for $v_i^{(tx)}$, the difference value between channel symbol and corner point of the uncertainty region S whose value is a maximum, by the following equations (11a) and (11b). For an uncertainty region with the four corner points ($c_1, c_2, c_3, c_4$) we have:

$$l_{\max} = \arg_l(\max(|y_j - c_l|)) \quad l = 1, 2, 3, 4 \quad (11a)$$

(where the $\arg(\max(f_l))$ operation can furnish the argument l for which $f_l$ is a maximum)

$$z^{(\max)}(j) = y_j - c_{l_{\max}} \quad (11b)$$

Each time the channel symbol with the smallest correction value $z^{(diff)}$ is chosen as the desired channel symbol $y^{(tx)}$ that is to be generated at the receiver input with the sought sending value, and the smallest correction value $z^{(diff)}$ is placed in buffer memory for further calculation steps. Thus:

$$j_{\min} = \arg_j(\min(|z_j^{\max}|)) \quad j = 1, 2, \ldots p, \quad (12a)$$

$$y^{(tx)} = y_{j_{\min}} \quad (12b)$$

$$z^{(diff)} = z^{(\max)}(j_{\min})$$

A decision is now made as to the position of the expected ISI component $E_{i+m}^{ISIpost}$.

If the expected ISI component $E_{i+m}^{ISIpost}$ in case A is located inside the "inner region" covered by the channel symbols, such as the square constructed by the four channel symbols of a conventional QPSK modulation (see FIG. 7), then the sending value $z^{(diff)}$ as determined per equation (12b) will be sent so as to enable a secure detection with low transmission energy and low associated ISI (S103). Thus, in case A we have:

$$|real(E_{i+m}^{ISIpost})| < 1 \wedge |imag(E_{i+m}^{ISIpost})| < 1 \rightarrow z_i^{(tx)} := z^{(diff)} \quad (13)$$

(with the definition A–>B: if A, then B)

Figure 4A:
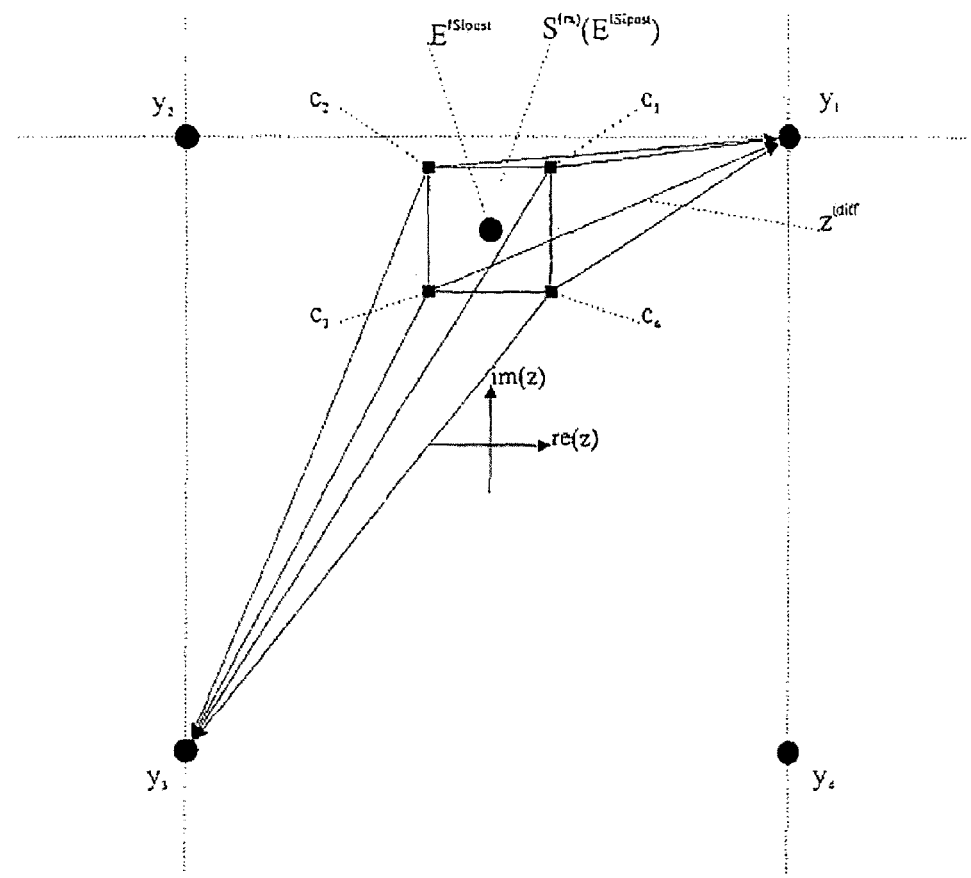

FIG. 4A shows a constellation for a QPSK modulation corresponding to case A, where the information symbol to be transmitted is $v_i^{(tx)}=+1$ and the channel symbols y1 and y3 can be selected. The uncertainty region $S^{(rx)}(E^{ISIpost})$ is located inside the "inner region" and the smallest correction value $z^{(diff)}$ corresponds to the distance between the furthest corner point $c_3$ and the channel symbol y1 selected on the basis of the least maximum corner distance. This smallest correction value $z^{(diff)}$ is then sent as the sending value to achieve the desired reception value.

If, on the other hand, in a case B, the ISI component $E_{i+m}^{ISIpost}$ is already in the decision-making region of the desired channel symbol, the sending value "0" will be sent (S104), since no correction is required. Thus, in case B (with the definition sign(x):Signum(x)):

$$|real(E_{i+m}^{ISIpost})| \geq 1 \wedge |imag(E_{i+m}^{ISIpost})| \geq 1 \wedge \text{sign}(real(E_{i+m}^{ISIpost})) = \text{sign}(real(y_{i+m}^{(rx)})) \wedge \text{sign}(imag(E_{i+m}^{ISIpost})) = \text{sign}(imag(y_{i+m}^{(rx)})) \rightarrow z_i^{(tx)} := 0 \quad (14)$$

Figure 4B:
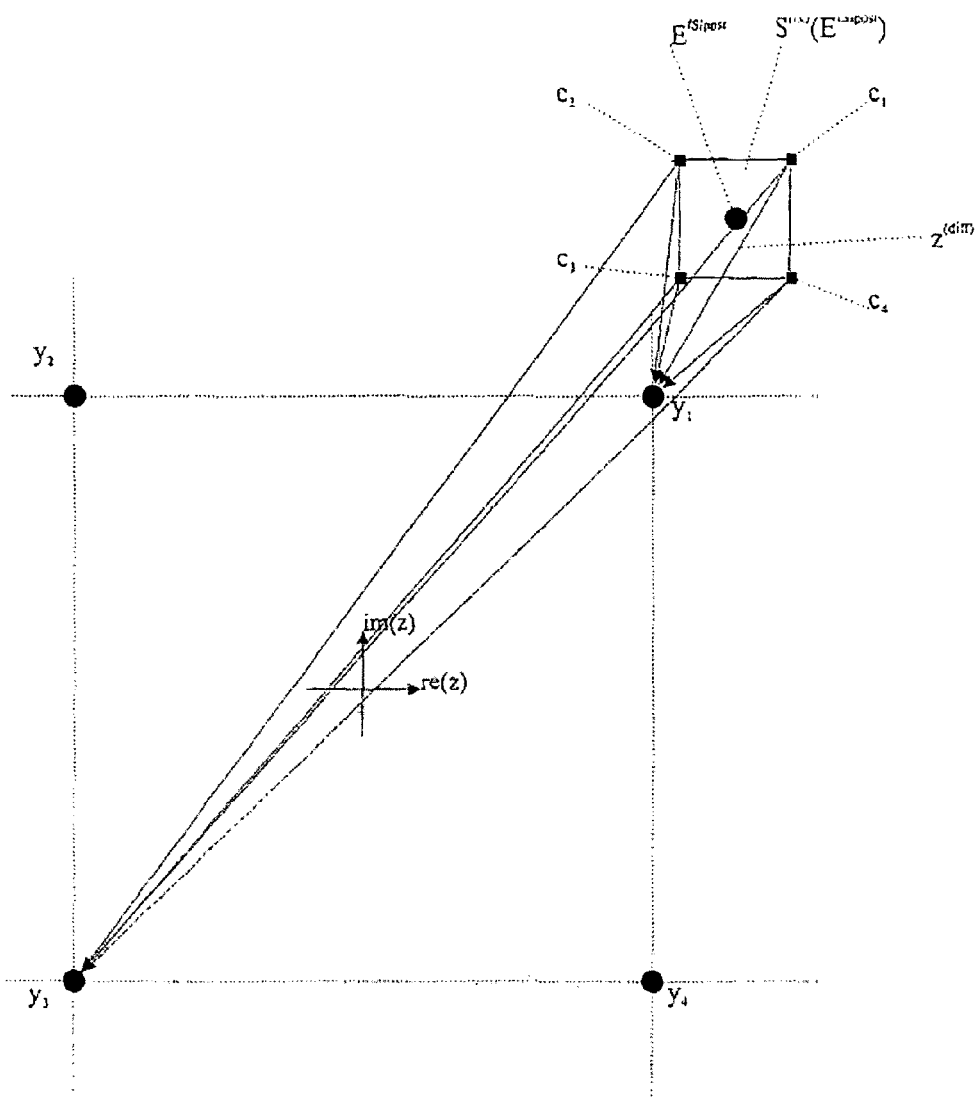

FIG. 4B shows a constellation for a QPSK modulation corresponding to case B, where the information symbol to be transmitted is also here $v_i^{(tx)}=+1$ and thus the channel symbols y1 and y3 can be selected. The uncertainty region $S^{(rx)}(E^{ISIpost})$ is already located without correction value inside the decision-making region established for the information symbol $v_i^{(tx)}=+1$ per equation (14). The smallest correction value $z^{(diff)}$ corresponds to the distance between the furthest corner point $c_1$ and the channel symbol y1 selected on the basis of the least maximum corner distance. In the present case, it is not the smallest correction value $z_{(diff)}$, but rather a sending value $z_i^{(tx)}:=0$ which is sent, since the desired reception value is achieved with high probability solely by the ISI components.

In all other situations (Case C), one transmits (S105), for example, the component of $z^{(diff)}$ that pertains to the smaller component (real( ),imag( )) of $E_{i+m}^{ISIpost}$. This is possible in this case, since only one component of $z^{(diff)}$ is already enough to accomplish a secure detection region for the reception value based on the uncertainty region $S^{(rx)}(E^{ISIpost})$ calculated in advance. Thus, in case C:

$$real(E_{i+m}^{ISIpost}) \leq imag(E_{i+m}^{ISIpost}) \rightarrow z_i^{(tx)} = real(z^{(diff)}) \quad (15a)$$

$$real(E_{i+m}^{ISIpost}) > imag(E_{i+m}^{ISIpost}) \rightarrow z_i^{(tx)} = imag(z^{(diff)}) \quad (15b)$$

Figure 4C:
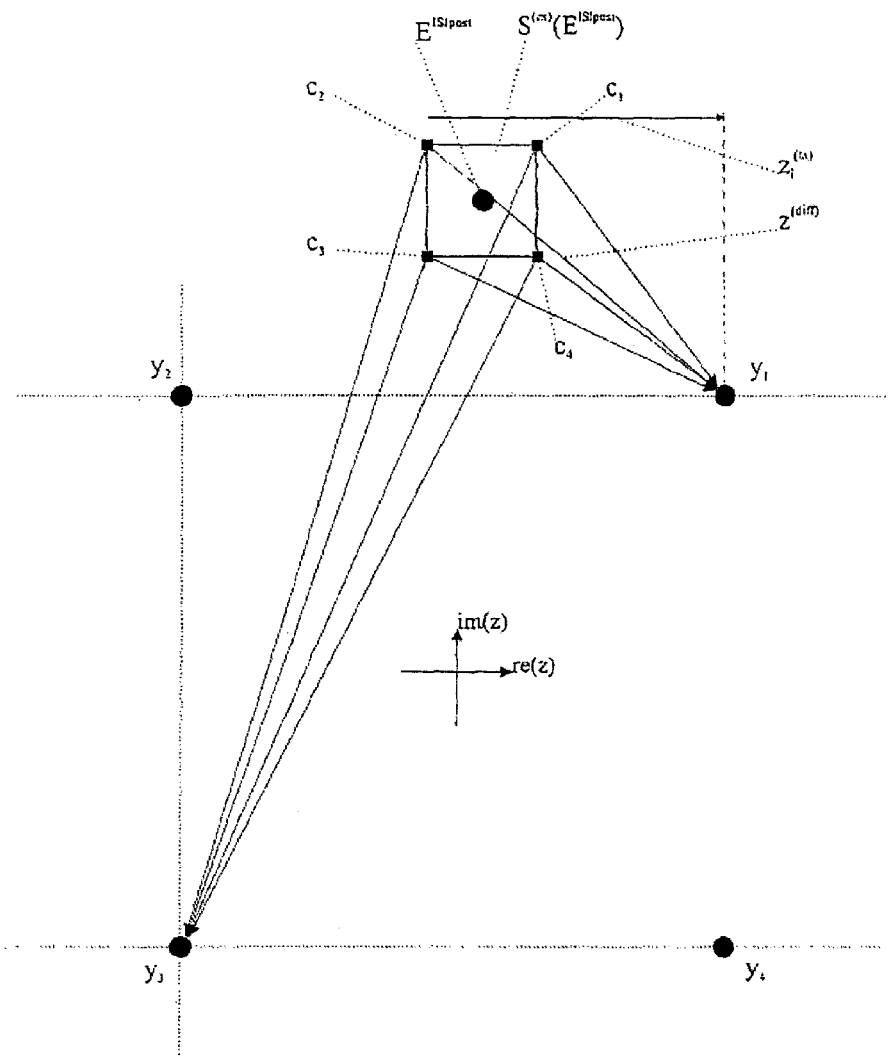

FIG. 4C shows a constellation for a QPSK modulation corresponding to case C, where once again the information symbol being transmitted is $v_i^{(tx)}=+1$ and thus the channel symbols y1 and y3 can be selected. The uncertainty region $S^{(rx)}(E_{ISIpost})$ is located horizontally next to the decision-making region established for the information symbol $v_i^{(tx)}=+1$ per equation (14). The smallest correction value $z^{(diff)}$ corresponds to the distance between the furthest corner point $c_2$ and the channel symbol y1 chosen on the basis of the least maximum corner distance. In the present case, it is sufficient to send the real portion of the smallest correction value $z^{(diff)}$, indicated as a horizontal arrow, as the sending value $z_i^{(tx)}=real(z^{(diff)})$, since the desired reception value is achieved with high likelihood merely by a correction using the real portion.

In step S106, a limiting of the region can then occur by limiting the complex components of the sent sending value according to the following equations (16a) and (16b), in order to limit the maximum transmission energy:

$$|real(z_i^{(tx)})|>r_{max} \rightarrow real(z_i^{(tx)})=\text{sign}(real(z_i^{(tx)}))\cdot r_{max} \quad (16a)$$

$$|imag(z_i^{(tx)})|>r_{max} \rightarrow imag(z_i^{(tx)})=\text{sign}(imag(z_i^{(tx)}))\cdot r_{max} \quad (16b)$$

The region can also be limited by limiting the amplitude of the complex sent signal value to a maximum value.

Finally, in step S107 the defining moment of time for selection of the next sending symbol is incremented, i.e., i=i+1.

In practice, one can often count the set Z of possible sending values (discrete, finite number). In this case, the range of values of many of the quantities calculated in the above algorithm, such as $E_{i+m}^{ISIpost}$, $z^{(max)}(k)$, can also be counted. Therefore, even prior to transmission, the possible values of many quantities can be calculated in advance and placed in tables of values. This will minimize the computational time outlay during the transmission.

The mode of functioning of the decoding method carried out in the receiver 30 shall now be explained by means of the flow chart of FIG. 4.

In step S200, a reception value z is received and taken to the decider 31. The decider 31 compares the reception value with predetermined decision-making regions for the possible channel symbols y according to the channel symbols available Y, in order to determine the received symbol (S201). This occurs according to equation (2). In the case of a QPSK modulation, the decision-making regions at the reception side can be the quadrants in the complex plane, for example.

FIG. 6 shows a general view of a decision-making region for a channel symbol y in the complex plane. For a signal value z lying inside the decision-making region, the decider 31 puts out the corresponding channel symbol y to the assigner 32.

Figure 5:
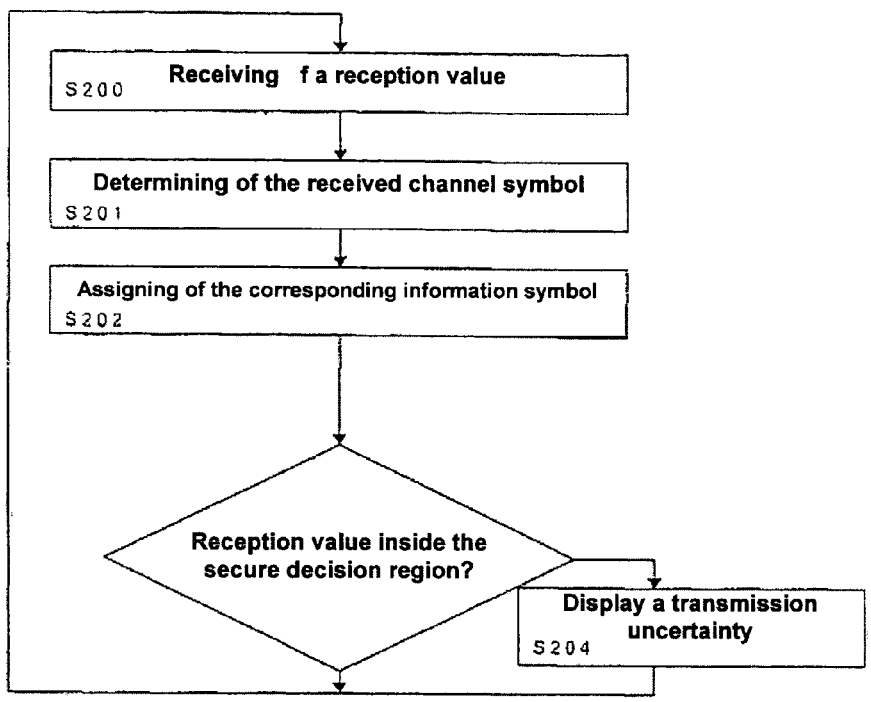

In step S202 of FIG. 5, a match-up between the discovered channel symbol y and the corresponding information symbol v takes place in the assigner 32 with the help of a mapping function f, which can be provided, for example, as a memory table or logic function in the assigner 32. The process then returns to step S200, waiting for the reception of a new signal value.

As a closer example, we shall now consider the case when the information symbol alphabet comprises two characters, which holds for BPSK, for example:

$$V=[v_1=-1, v_2=+1]. \quad (17)$$

Let the set of possible sending symbols be given by a square with length of side $2r_{max}$ at the origin of the complex plane, according to the following definition:

$$Z^{(tx)}=\{z|-r_{max}<real(z)<r_{max} \wedge -r_{max}<imag(z)<r_{max}\} \quad (18)$$

Accordingly, a QPSK modulation is defined as the channel symbol alphabet:

$$Y=[y_1=+1+j, y_2=-1+j, y_3=-1-j, y_4=+1-j]. \quad (19)$$

Thus, for the mapping function f(·), which maps the channel symbols in the assigner 32 onto the information symbols, we have:

$$f(y_1=+1+j)=+1$$

$$f(y_2=-1+j)=-1$$

$$f(y_3=-1-j)=+1$$

$$f(y_4=+1-j)=-1 \qquad (20)$$

There exist thus p=2 channel symbols which can be selected for the transmission of a given information symbol.

Figure 7:
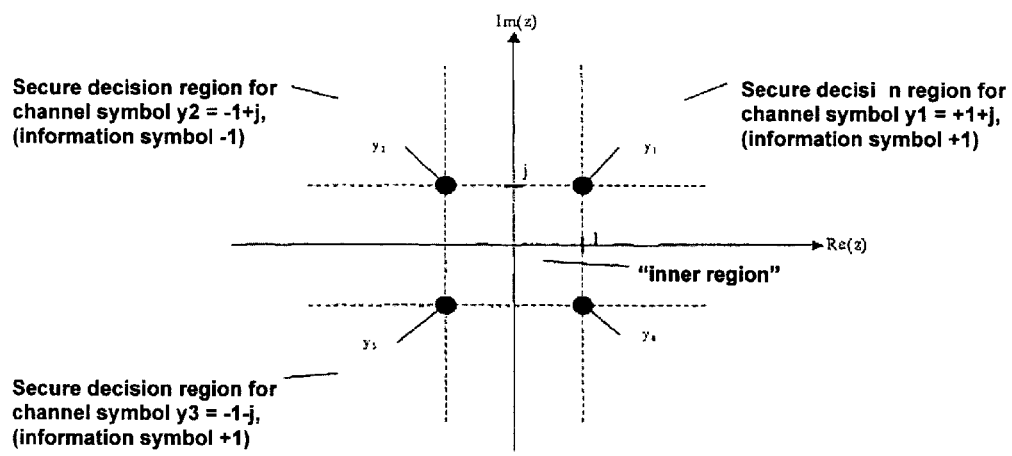

FIG. 7 shows the decision-making regions considered certain for the channel symbols. Calculation of the sending values is such that the reception values lie with high probability in the certain decision-making regions. Since a distinct decision always has to be made at the receiver side, it is permissible to allow expanded decision-making regions neighboring each other there, such as the complete quadrants.

It is assumed that the channel does not have intense preoscillation and consequently:

$$h_i \ll h_m \text{ for } i<m. \qquad (21)$$

In practice, such a behavior can be assured by using a linear prefilter, adapted to the channel.

Figure 8:
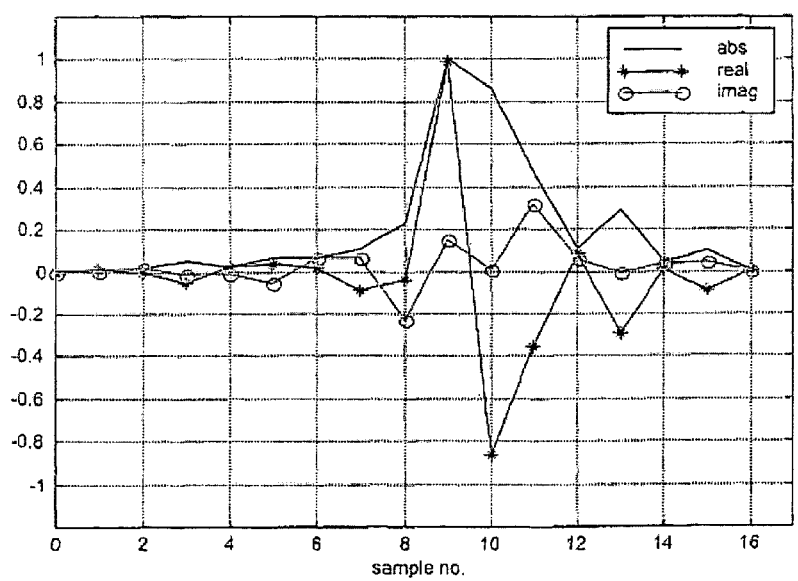
Figure 9:
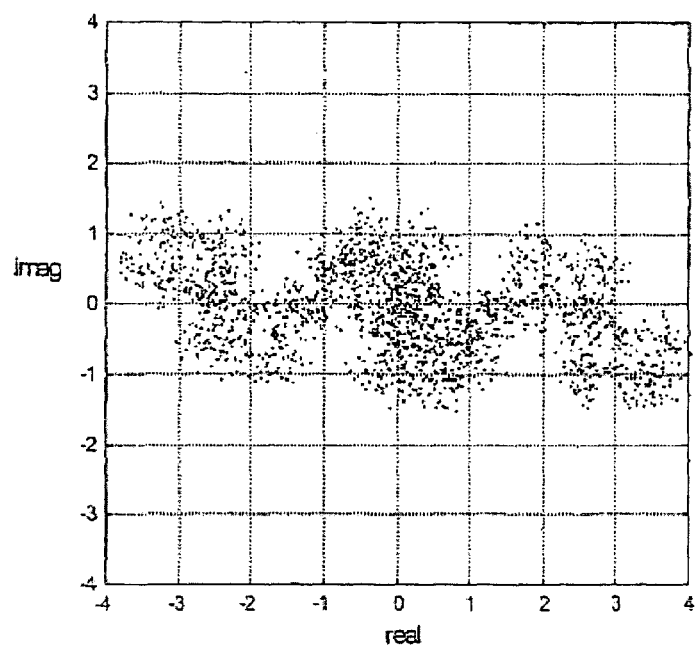

FIG. 8 shows the complex channel pulse response of a low-preoscillation system in the symbol pulse. According to this channel pulse response, we have a channel ordering of n=16 and a channel delay of m=9, which need to be appropriately factored into the transmitter 100. If, for example, a BPSK symbol stream of 2000 symbols is transmitted via this channel, one obtains a constellation per FIG. 9 at the receiver input without superimposed noise or interference signals. Obviously, due to the ISI caused by the channel, error-free detection at the receiver 30 is not possible without additional compensation measures.

Figure 10:
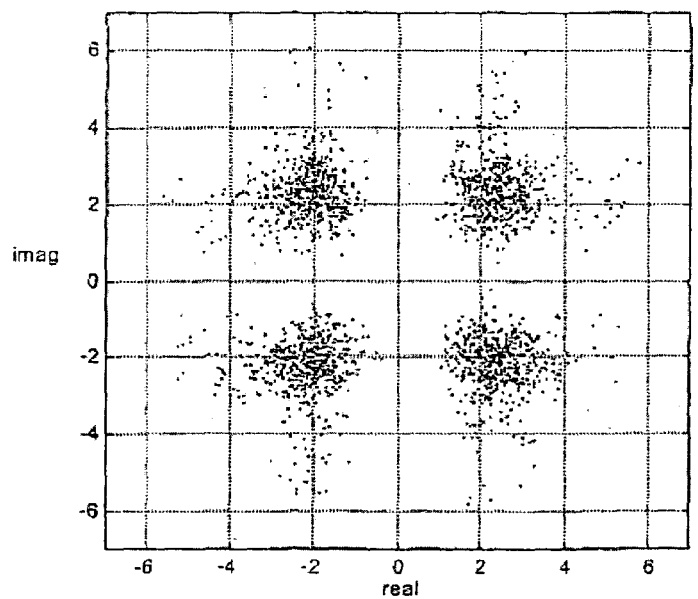

If, on the contrary, one uses the above-described MCP encoding method, one gets a constellation per FIG. 10 at the receiver input. This corresponds to four clusters of points, between which a cross-shaped empty space like FIG. 7 emerges. The limitation by equations (16a) and (16b) has been set at $r_{max}=3$ here. A subsequent analysis of the simulation process shows that 21 out of 2000 symbols have been limited. The crest factor of the sending symbol stream was around 2-2.5.

A simple detector, which detects the underlying information symbol v by means of the quadrant in which a reception symbol lies, would produce an error-free stream of reception symbols at the receiver output in this case.

Figure 11:
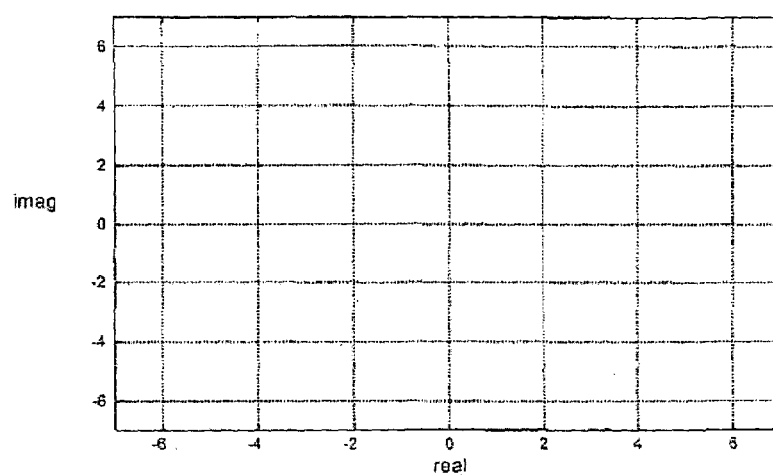

We shall now discuss the scrambling function as an incidental benefit of the MCP encoding method, using the representation in FIG. 11. FIG. 11 shows a constellation which occurs at the receiver 30 when a constant sequence of information symbols $v_i=1$ is transmitted. According to FIG. 11, the signal values at the reception side (reception values) lie in both quadrants assigned to the information symbol v=+1. Hence, the reception signal contains temporal changes which facilitate a synchronization at the receiver side, without requiring additional descrambling measures.

Figure 12:
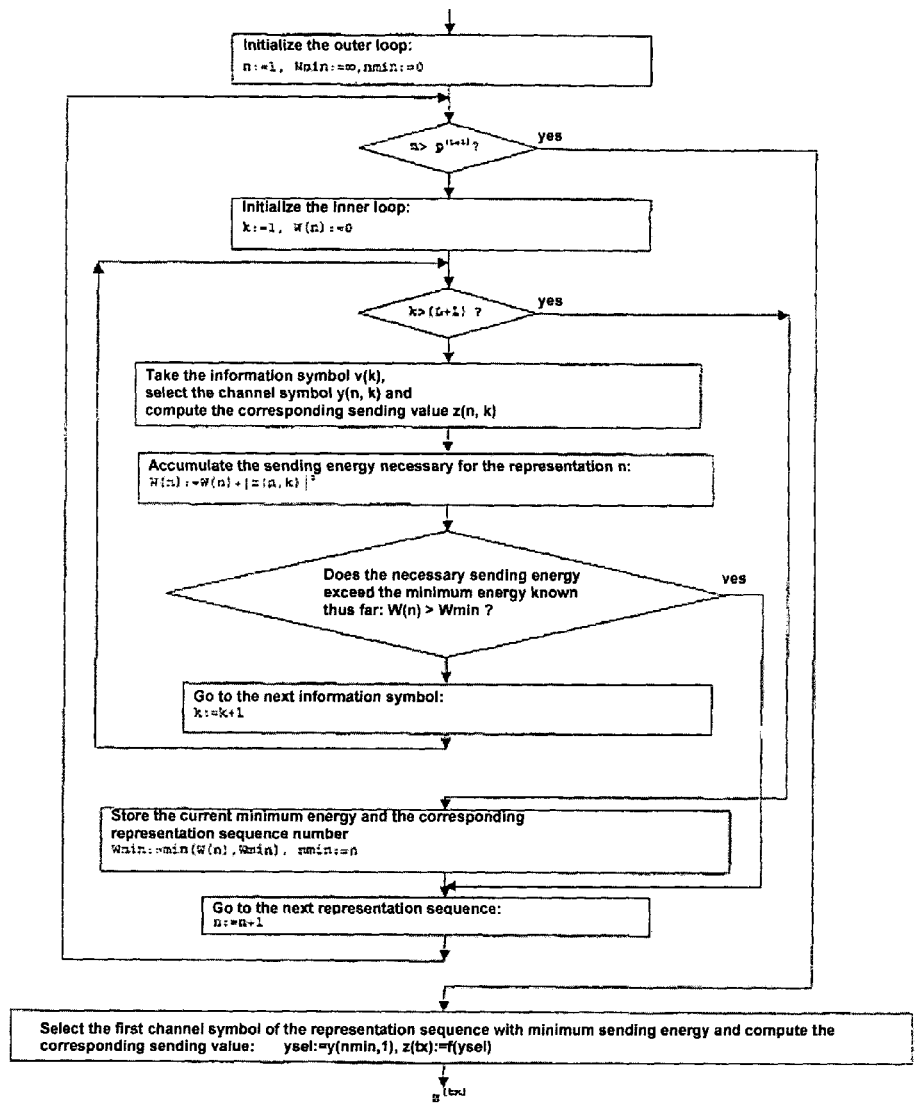

The method described in the present application can also be summarized by saying that one makes a selection from p possible representations (channel symbols) for an information symbol which is to be transmitted from a transmitter to a receiver and determines the sending value which is required for the selected channel symbol to appear in the receiver's input. Minimization of the energy of the sending value serves as the criterion of choice. Therefore, the invention can also be described as a symbolwise multiple-choice-precoding (MCP). One possibility of expanding the symbolwise MCP is a forward-looking MCP, as depicted in a flow chart per FIG. 12. Here, with L information symbols to be sent in future and p possible representations, one gets a totality of $p^{(L+1)}$ representation sequences. Accordingly, the flow chart contains an outer loop through $p^{(L+1)}$ representation sequences. Each representation sequence consists of (L+1) channel symbols and the corresponding sending values. Hence, an inner loop is represented in the flow chart. In this inner loop, the energy values of the sending values are added up. The inner loop ends either when all (L+1) values have been computed or when the energy sum exceeds the previous minimum. In the latter case, a premature interruption is possible, since it is certain that the final overall energy of the particular representation sequence is greater than the final overall energy of at least one other previously computed representation sequence. After working off the outer loop, the representation sequence whose sum of sending energy values is minimal is known. Since the selection criterion is the minimization of the overall energy of a sequence of sending values, the first channel symbol of the representation sequence with minimum sum of sending energy values is selected as the channel symbol for the current information symbol being sent. In the same way as the method described per FIG. 2, the sending value is computed as a function of the selected channel symbol and sent out. The special advantage of forward-looking MCP over symbolwise MCP consists in the minimization of the mean and maximum sending value energy. In formal terms, the computation of the forward-looking MCP can be defined as a problem which consists in making a sequence of discrete decisions so that a cost function is minimized. For problems of this kind, typically described as "find an optimal decision-making sequence," mathematical solutions exist, such as "dynamic programming," which are more effective in computing speed than the already described method of testing one by one, but far more complex in their implementation and description. Therefore, we shall merely point out that the MCP technique, unlike other precoating methods, makes it possible to use familiar, highly developed optimization algorithms. For example, the fact that the overall energy being minimized in MCP is a quadratic function can be exploited to formulate the computing of the sending values as a quadratic optimization (quadratic programming) problem. The general form of the quadratic optimization problem (as well as a corresponding solution algorithm) is defined, for example, in the optimization toolbox of the MATLAB Program and reads:

$$\min_x x^T \cdot H \cdot x + f^T x, A \cdot x \Leftarrow b$$

If one inserts the real and imaginary parts of a sequence of sending values for x, the unit matrix for H, the null vector for f, the convolution matrix for A, which can be formed from the known channel pulse response, and the real and imaginary parts of a representation sequence for b, one can now compute this representation sequence with the general methods of optimization theory as the optimal sequence of sending values for energy minimization. This involves a certain amount of numerical expense. Yet the advantage of this technique is that, with the present invention (MCP), it is also applicable to channels with any given preoscillation, without requiring the use of a FIR filter.

As shown, the described algorithm implicitly contains a scrambling function when the channels are sufficiently distortion-rich. In order to also furnish a scrambling function when the channels are distortion-free or distortion-poor, the desired channel symbol $y^{(tx)}$ can be randomly selected, for example. In this way, a good dynamics is ensured in the reception symbol sequence for each information symbol sequence and, thus, code transparency for the method.

The invented encoding method (MCP) is based on the basic notion of a channel symbol alphabet which is more powerful than the information symbol alphabet, i.e., the channel symbol alphabet contains at least one more element than the information symbol alphabet. By using an enhanced linearity and dynamic region at the sending side, the intersymbol interference caused by the channel is drastically reduced with minimal expense at the receiver side. Since it is calculated in advance at the transmitter side which values will come under the channel influence at the receiver side, knowledge of the channel pulse response at the transmitter side is necessary. In view of the fact that any filtering and synchronization operations in the receiver also have influence on the resulting channel pulse response, these operations can and should be easily predictable, or at least predictable at the transmitter side. The constellations obtained at the receiver input by simulation give us an idea as to the performance of the MCP method.

In practice, situations exist in which, at a sending time j, besides the present information symbol there are also already known the following L information symbols $v_j, v_{j+1}, \ldots, v_{j+L}$ being transmitted. Therefore, one way of expanding the sample embodiment is to consider these future L information symbols when determining the current sending value $z_j^{(tx)}$. For this, one calculates in advance all possible channel symbol sequences:

$$yk_j, yk_{j+1}, \ldots yk_{j+L}$$

which are considered for representing the information symbol sequence $v_j, v_{j+1}, \ldots, v_{j+L}$, for example. The current sending value $z_j^{(tx)}$ is then determined such that a minimum anticipated required sending energy results for the next L symbols, i.e., $$\min\left(\sum_{i=j}^{j+L} |z_i|^2\right)$$

and all $z_i$ are contained in the set of possible sending symbols, i.e., $$z_i \in Z^{(tx)} \ (i=j, j+1, \ldots, j+L)$$

and the detection at the receiver side is possible without error for presumably all $z_i$, i.e., $$D_i^{err} < 0 \ (i=j, j+1, \ldots, j+L)$$

Since computing power is freed up at the receiver side for equalization when MCP is used, it is possible to either economize this computing power entirely, or to use it to further improve the transmission. For example, it is possible to provide an adaptive equalizer at the receiver side in addition to MCP, which will track and compensate for the deviation between the measured channel pulse response and the actual channel pulse response necessarily occurring in practice. The advantage over a solution without MCP consists in that the adaptive equalizer with MCP only has to correct the distortions contained in the reception value by reason of the deviation between the measured channel pulse response and the actual or effective channel pulse response. This can be done with lower numerical resolution and, thus, lower costs than a solution without MCP.

The MCP method can be used advantageously in applications, for example, where time-invariant channels with strong reflections are disrupting the communication between a base station and many subscriber stations as the main source of interference, such as WLL systems. Of course, the MCP method can also be used advantageously in higher-stage PSK and in DPSK modulation methods or also in other suitable types of modulation.

Furthermore, it is also apparent that bit sequence-independent synchronization is facilitated and thus can be made more cheap with MCP for all data rates.

The invention claimed is:

1. A method for encoding of an information symbol associated with an information symbol alphabet to be transmitted across a transmission channel, comprising:
   a) selecting a channel symbol alphabet having at least one more element than the information symbol alphabet;
   b) determining a postoscillation behavior of the transmission channel;
   c) calculating in advance reception signal values anticipated at a receive end of the transmission channel when transmitting selectable channel symbols, based on the postoscillation behavior;
   d) selecting one of the selectable channel symbols in relation to the reception signal values;
   e) using the selected channel symbol for encoding of the information symbol;
   f) calculating a sending signal value as a function of the selected channel symbol and the reception signal; and
   g) outputting the sending signal value.

2. The method of claim 1, wherein at least two channel symbols are provided for each information symbol.

3. The method of claim 1, wherein the reception signal values define an uncertainty region; and
   wherein the selection of the selectable channel symbol is done based on its position relative to the uncertainty region.

4. The method of claim 3, wherein the uncertainty region is determined in relation to the preoscillation behavior of the transmission channel.

5. The method of claim 1, wherein preoscillation and postoscillation behavior of the transmission channel is determined by means of the channel pulse response.

6. The method of claim 5, wherein compensating for a deviation between measured and real channel pulse response at the receiver side using an adaptive equalizer.

7. The method of claim 3, wherein the selection of the selectable channel symbol is done in relation to a smallest correction value relative to one or more corner points of the uncertainty region.

8. The method of claim 3, wherein the selection or the selectable channel symbol is done in relation to a smallest correction value relative to a most distant point of the uncertainty region.

9. The method of claim 1, wherein a sending value "0" is used to transmit a channel symbol where an anticipated reception signal value caused by inter-symbol interference is situated within a region associated with a higher probability of detection for the channel symbol being transmitted at the receiver side.

10. The method of claim 1, wherein a difference between a selected channel symbol and anticipated worse case intersymbol interference is used as a sending value to transmit a channel symbol being sent where the corresponding reception signal value is located in a region defined and subtended by channel symbols.

11. The method of claim 9, wherein limiting of the region is carried out in that complex components associated with the sending signal value are limited to a maximum value.

12. The method of claim 11, wherein the limiting of the region is done in that an amplitude of the complex components associated with the sending signal value is limited to a maximum value.

13. The method of claim 1, wherein the information symbol being transmitted is a BPSK symbol and the selectable channel symbols are QPSK symbols.

14. The method of claim 1, wherein the set of possible sending signal values is not countable.

15. The method of claim 1, wherein the set of possible sending signal values is countable and thus discrete.

16. The method of claim 15, wherein a pre-encoder function is implemented in the form of a table of values after determining transmission channel properties.

17. The method of claim 16, wherein the pre-encoding function is realized in the form of a table of values for probable types of channel pulse response defined prior to the determination of the transmission channel properties.

18. The method of claim 1, wherein the sending signal value is determined in relation to possible channel symbol sequences which can be used for subsequent information symbols being transmitted.

19. The method of claim 1, wherein the selection of channel symbols is random in order to accomplish a scrambling function.

20. The method of claim 1, wherein at least one of a higher-stage PSK modulation or a DPSK modulation is used for the encoding of the information symbol.

21. A method for decoding a reception signal value received via a transmission channel, comprising:
a) determining a QPSK channel symbol from the reception signal value using a decision-making function, said determination being made in relation to a quadrant in which the reception signal is located;
b) assigning an information symbol, for which the determined channel symbol is selectable during the encoding;
c) determining (i) a detection uncertainty in relation to a distance between the reception signal value and (ii) limits for a secure decision region associated with the channel symbol, wherein the distance is at least one of a Euclidean distance and a Hamming distance; and
d) outputting data which is representative of one or more information symbols using the detection uncertainty and/or the limits for the secure decision region.

22. The method of claim 1, wherein a set of information symbols to be transmitted in future is used in selecting the current channel symbol.

23. The method of claim 22 wherein a mean and maximum sending value energy is minimized by taking into account future information symbols to be transmitted when selecting the current channel symbol.

24. A device for encoding an information signal to be transmitted across a transmission channel, comprising:
a) an encoder to furnishing a plurality of selectable channel symbols for the information symbol being transmitted;
b) a computing unit to compute one or more reception signal values anticipated at a reception end of the transmission channel in relation to transmission of the plurality of selectable channel symbols, and in relation to postoscillation behavior of the transmission channel;
c) a selection unit to selecting one of the plurality of selectable channel symbols in accordance with the anticipated reception signal values and encoding the information symbol being transmitted using the selected channel symbol; and
d) a sending value computing unit to: (i) compute a sending value as a function of the selected channel symbol and the anticipated reception values and (ii) output the sending value.

25. The device of claim 24, wherein the computing unit further comprises:
a first storage unit to store sending values previously sent;
a second storage unit to store channel coefficients describing the postoscillation behavior of the transmission channel;
a multiplication unit to multiply the sending values previously sent with the corresponding channel coefficients; and
an addition unit to add results from the multiplication unit.

26. The device of claim 25, wherein the anticipated reception signal values are calculated in the computing unit in relation to an addition result received from the addition unit, the selected channel symbol, and an anticipation value which takes into account the preoscillation behavior of the transmission channel.

27. The device of claim 26, further including a prefilter adapted to the transmission channel to diminish the preoscillation behavior of the transmission channel.

28. A device for decoding a reception signal value received via a transmission channel, comprising:
a decision-making unit comprising a detector to determine a channel symbol from the reception signal value using a decision-making function that considers a quadrant in which the reception signal is located;
an assignment unit to assign an information symbol for which the determined channel symbol is selectable during encoding; and
an error assessment unit to: (i) determine a detection uncertainty based on a distance between the reception signal value and limits of a decision-making region considered to be secure for the determined channel symbol and (ii) output data which is representative of one or more information symbols using the detection uncertainty and/or the limits for the decision-making region.

* * * * *